Jan. 7, 1941. E. C. OSWALD ET AL 2,227,738
PREPARATION OF HAMS
Filed Nov. 29, 1939 2 Sheets-Sheet 1

INVENTORS
Reese G. Lewis
BY Elmer C. Oswald
Carl C. Batz
ATTORNEY

Jan. 7, 1941. E. C. OSWALD ET AL 2,227,738
PREPARATION OF HAMS
Filed Nov. 29, 1939 2 Sheets-Sheet 2

INVENTORS
Reese G. Lewis
Elmer C. Oswald
BY Carl C. Batz
ATTORNEY

Patented Jan. 7, 1941

2,227,738

UNITED STATES PATENT OFFICE 2,227,738

PREPARATION OF HAMS

Elmer C. Oswald and Reese Gardiner Lewis, Chicago, Ill., assignors to Armour and Company, Chicago, Ill., a corporation of Illinois Application November 29, 1939, Serial No. 306,708

7 Claims. (Cl. 99—208)

This invention relates to dried hams and processes for preparing them. The invention deals more particularly with processes for preparing the dried hams, such as the Italian hams, to obtain a boneless product.

The hams here referred to are those which in the course of preparation are subjected to extended drying treatment and which are quite firm and hard. Typical of this class of hams are the "Italian" hams and the "Virginia" hams, which have been marketed for many years and still are in demand, particularly in certain localities.

In all prior processes it has never been possible to dry the ham with the bone removed, and a very serious objection to the dried hams heretofore on the market is that due to the presence of the bone the ham is hard to cut into suitable slices and the meat retailer has never been able to get a satisfactory yield in cutting the meat from the bone. Because of the bone, the marketman has not been able to use a slicing machine, and since the meat is firm and hard he cannot carve it effectively with a knife. The customary way of slicing such hams is to cut them more or less parallel with the bone, and this is wasteful and usually requires cutting with the grain of the meat. From a standpoint of tenderness and palatability, it would be desirable to cut against the grain of the meat, but the bone contained in this firm type of ham has heretofore made this impracticable.

Though hams of the soft, tender type have long been prepared in boneless form, the severe drying treatment characteristic of dried ham processes has heretofore prevented boning of such hams. The problem of drying a boned ham is made particularly difficult because of the opportunity during the long drying period for growth of micro-organisms which deleteriously affect the product. It has been found impossible to remove the bone from a ham without inoculating the cavity with objectionable micro-organisms to at least some degree. In the later extended drying period these organisms will normally grow and the bone cavity provides a place very favorable to such organisms during this period.

An important object of this invention is to provide in boneless form a ham product which has all the body and flavor characteristics of the dried type of hams, and another object is to provide a procedure for preparing a boneless dried ham product wherein the objectionable growth of micro-organisms in the course of continued drying is held to a minimum.

We have found that by maintaining a boned ham under pressure during the extended drying period the growth of objectionable organisms within the ham is substantially reduced and in addition we have found that by placing fat in a bone cavity prior to the application of pressure, we can restrict the growth of objectionable organisms within the ham still further. These and other details of the invention will be more clearly understood after the following detailed explanation.

The following detailed description of the manufacture of Italian ham explains one mode of practicing the invention:

The hams to be treated may be placed in a vat in contact with the curing composition commonly used in the preparation of this particular type of dried ham, and may be left in cure for about 30 to 50 days as is the usual custom. At the close of this curing period the hams may then be soaked in warm water for about an hour to soften them preparatory to boning.

Figures 1, 2:
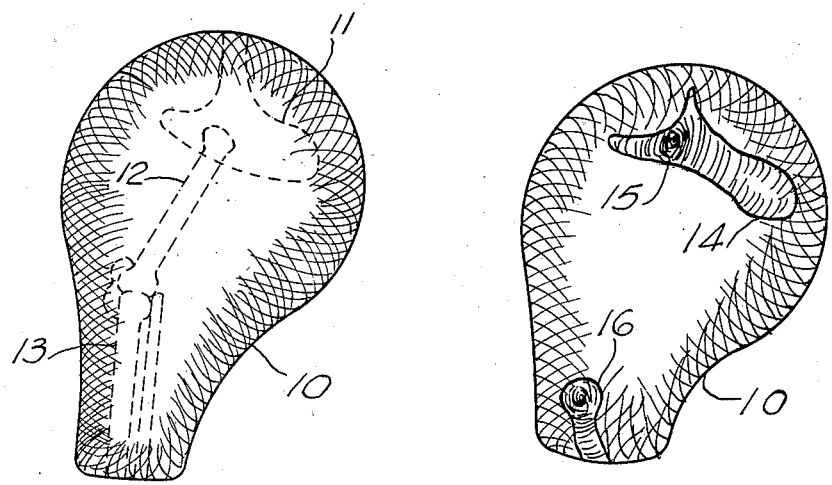
Figure 1 illustrates a fresh ham at the start of the treatment, the bones being shown in dotted outline.
Figure 2 shows the ham after the shank end has been severed and the bone removed.

As shown in Figure 1, the ham 10 contains the H bone 11, the femur 12, and the shank bone 13. The H bone is carved out and removed, and this leaves a channel-like cavity 14 as shown in Figure 2.

Figures 3, 4:
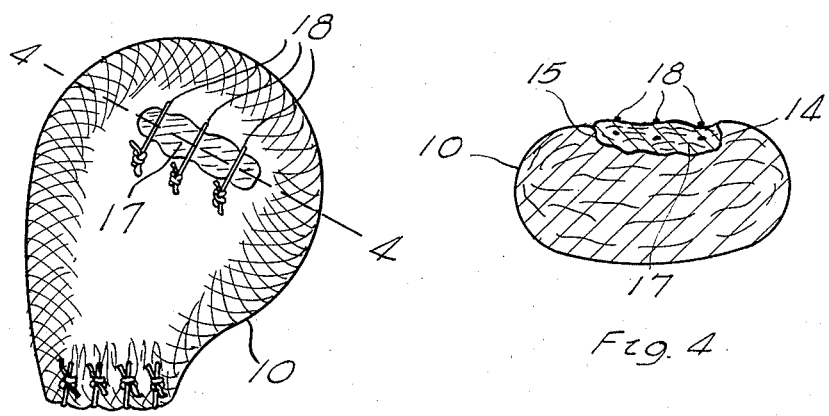
Figure 3 shows the boned ham after the fat has been placed in the bone cavity.
Figure 4 is a sectional view taken at line 4—4 of Figure 3.

Preferably, the extreme shank end of the ham is severed and removed since this enables easier boning and a more convenient shape for pressing. In removing the shank and femur, these bones are chiseled about from each free end and then pulled endwise from the ham. This leaves a rather ragged opening at 15 which deepens cavity 14, and also an opening 16 at the shank end. Preferably, the shank end of the ham is then stitched as shown in Figure 3 to bring the skin or flesh over the end of the ham and to close opening 16.

Pieces of fat 17 may be filled into the cavity 14 and opening 15, and with the fat so placed, the edges of the cavity may be pulled up firm with the fat by taking stitches 18. Advantageously, the fat so used may be carved from some fatty portion of the ham. Figures 3 and 4 show the ham as fatted and sewed, ready for pressing.

The ham may be put in the press 19, which press may be of pear-shape cross section and may be lined with a suitable parchment paper 20. When the clamps 25 of the press are set, the meat is under spring pressure of, for example, about 100 pounds per square inch, and may be left so compressed for about ten days. During this period the meat assumes a definite shape and drains off excess moisture.

Figure 6:
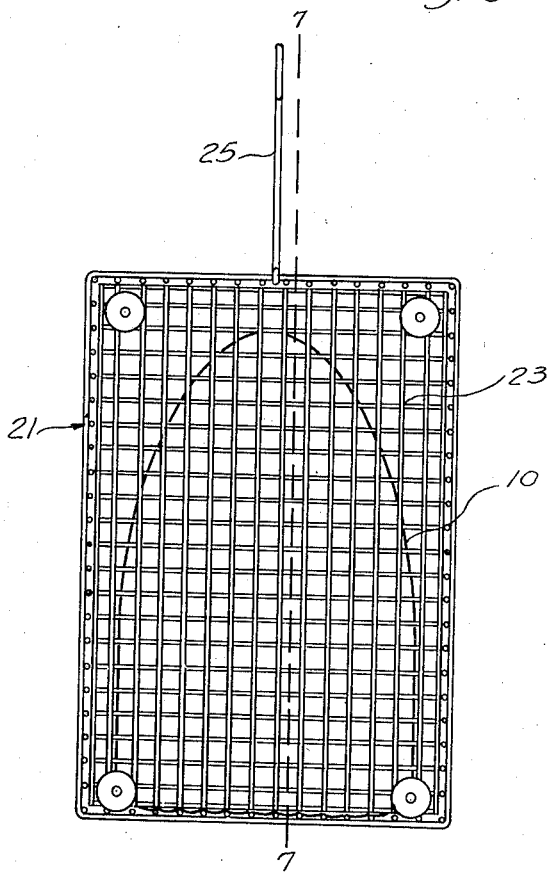
Figure 6 is a front view of the ham as held under pressure during the drying period.
Figure 7:
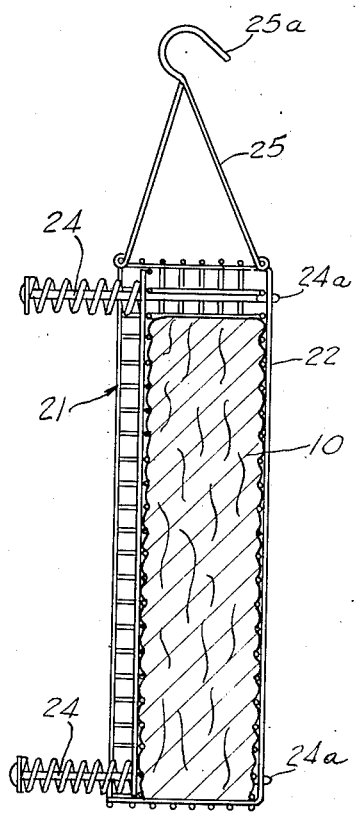
Figure 7 is a sectional view taken as indicated at line 7—7 of Figure 6.

When removed from press 19, the ham is placed in a perforate press such as the wire mold 21 shown in Figures 6 and 7. The mold 21 is formed of wire mesh and comprises a container 22 and cover 23. The cover is pressed down tightly against the ham by means of spring-pressed rods 24 which have their hooked ends 24a engaged about a wire of the container bottom. A bracket 25 supports the mold and has a hook 25a for convenience in hanging the mold in the drying room.

The mold 21 containing the ham 10 under pressure is hung in a drying room for from about 30 to 60 days. If an especially hard Italian ham is desired, the drying may be extended even beyond 60 days. Also the drying time may be somewhat less than 30 days if the room temperature is somewhat higher, but must not be less than 20 days using a temperature of about 50° F. if a ham of the type herein contemplated is to be produced.

During the drying period the ham loses moisture and also changes its flavor somewhat. The change in flavor may be due to drying or to aging or both, and is characteristic of hams of this type.

The ham as thus prepared is compact in shape and contains meat of the same body and flavor characteristics as the ordinary Italian hams containing bones. It will be apparent that this product may be placed in the slicing machines now in common use in meat markets and may be sliced in slices of any desired thickness. The slicing may be done across the grain of the meat thereby cutting the fibers and making the meat more palatable. A very important advantage is gained in obtaining a substantially greater yield of meat slices from the dried ham, and another important advantage is in the greater convenience to the retailer in the marketing of this type of ham.

The detailed description herein set forth gives one specific mode of making a boneless Italian ham by our new process, but it is expected that the specific procedure may be varied greatly in accordance with common knowledge in the meat packing industry, while still utilizing the features of our invention.

Instead of curing the ham prior to the removal of the bones, as explained in the foregoing example, the ham may first be boned and then placed in cure; and after being cured may be treated as explained in the example given.

Other kinds of hard or dried hams may be prepared by our improved method, such as the Virginia ham. The principal variations for producing other kinds of hard hams consists of using a different kind of curing composition, trimming the ham differently, or in using different times and temperatures at certain stages of the process. In preparing the Virginia ham the drying period may be from three to six months under ordinary drying conditions, but may be less than this under special controlled drying conditions employing higher temperatures.

Our invention deals exclusively with the hard or dried type of hams, and must be clearly distinguished from other processes where the extended drying period is not employed. In this description and the appended claims, the term "dried hams" will be understood to mean hams which have been subjected to the drying and aging treatment for at least a period the equivalent of 20 days in a drying temperature of 50° F.

As previously stated, this extended drying period makes this type of ham peculiarly subject to spoilage through growth of objectionable organisms. We now find that the maintenance of pressure on the boned ham during the drying period operates to discourage the growth of objectionable organisms within the ham so that it is possible to dry a boned ham. We believe that an explanation for this is that the pressure during the drying period keeps the cracks and cavities from opening and excludes air from the cut and torn surfaces. When held in the compact mass with all cavities closed, it appears that the most favorable places for the growth of objectionable micro-organisms are eliminated.

It will also be understood that the feature of holding the ham under pressure during the drying period, works in conjunction with the initial compressing step in accomplishing the purpose intended. The initial pressing step, wherein the meat is compressed in a mold, serves to shape the meat and close the cavities, but as we have now found, this in itself is insufficient to prevent spoilage during the subsequent drying period. The strong pressure of the initial mold, however, does serve well in conjunction with the later pressing during drying to prevent formation of mould and bacterial disturbances.

Another feature which also aids is the filling of the cavities with fat prior to pressing. Not only does the fat make it easier to maintain a closed cavity by reason of its bulk, but the fat serves to keep the surface of the cavities greased; and since the fat is less subject to shrinkage, this factor also helps to keep the cavities full during the drying period.

Figure 5:
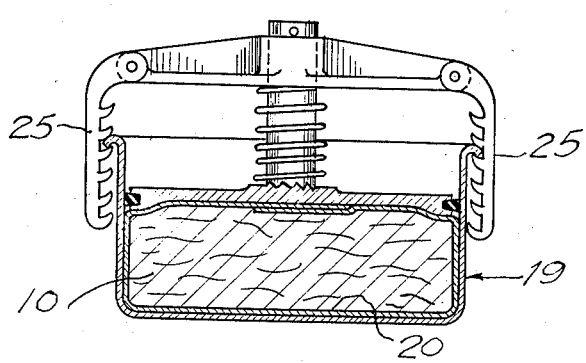
Figure 5 shows the ham being pressed in a mold.

In Figure 5 of the drawings is given a specific type of mold, but it is contemplated that other types of molds can be used. For example, the molds might have a different cross sectional shape and may have different means for maintaining the pressure. It is, of course, desired that the mold used be sufficiently strong and provided with suitable means for maintaining a strong resilient pressure.

Other apparatus may also be substituted for that shown in Figures 6 and 7. Wire molds have previously been used to form other types of meat products during application of heat in cooking, and some types of molds which have been used in this connection may be found suitable for pressing the ham during drying in the present process. It is essential, however, that the mold used be perforate so as to permit drying to take place without difficulty. Though no heavy pressure is required during drying, it is important that the screen or wire mold used be sufficiently stiff and strong to insure against deformation of the ham or opening of any cavities during the drying period.

We claim:

1. A process for preparing dried hams comprising removing the bones from the ham, pressing said ham to shape it in a compact mass with bone cavities closed, and subjecting the pressed ham to drying treatment while maintaining it under pressure.

2. A process for preparing dried hams comprising removing the bones from ham, placing fat into the cavity formed by the removal of a bone, pressing said ham to shape it in compact mass whereby the walls of a bone cavity are brought into engagement with said fat, and subjecting the pressed ham to drying treatment while maintaining it under pressure.

3. A process for preparing dried hams comprising removing the bones from the ham, placing fat into a cavity formed by the removal of a bone, stitching the meat adjacent said cavity to close said cavity against said fat, pressing said ham to shape it in compact mass, and subjecting the pressed ham to drying treatment while maintaining it under pressure.

4. In a process for preparing a boneless dried ham, the step of subjecting a boned ham to drying treatment while maintaining pressure against the sides of said ham to prevent opening of cavities during such treatment.

5. A process for preparing dried hams comprising removing bones from a cured ham, pressing said boned cured ham to form it in a compact mass, and subjecting said pressed boned cured ham to a drying treatment while maintaining pressure against the sides of said ham.

6. A process for preparing dried hams comprising subjecting said ham to contact with a curing composition for sufficient time to permit absorption of cure, removing bones from said cured ham, pressing said ham in an imperforate mold of regular outline to form the ham in a compact mass, and subjecting said ham to an extended drying treatment while maintaining pressure against opposite sides of the ham.

7. A process for preparing dried hams comprising subjecting the fresh ham to a curing operation in which the ham is subjected to contact with a curing compound for a sufficient period of time to permit absorption of the cure into the ham, removing the bones from said cured ham, pressing the ham in an imperforate mold to form it in a compact mass, maintaining said ham under pressure in said mold for a period of time sufficient to set the meat in the shape of the mold, removing the ham from said mold and placing it in a perforate mold adapted to exert pressure against opposite sides of the ham, and subjecting said ham to an extended drying treatment, while under pressure in said perforate mold.

ELMER C. OSWALD.
REESE GARDINER LEWIS.